June 4, 1940.   J. NICOL   2,203,599
SITTING DRIVE DELIVERY VEHICLE
Filed Dec. 7, 1938   2 Sheets-Sheet 1
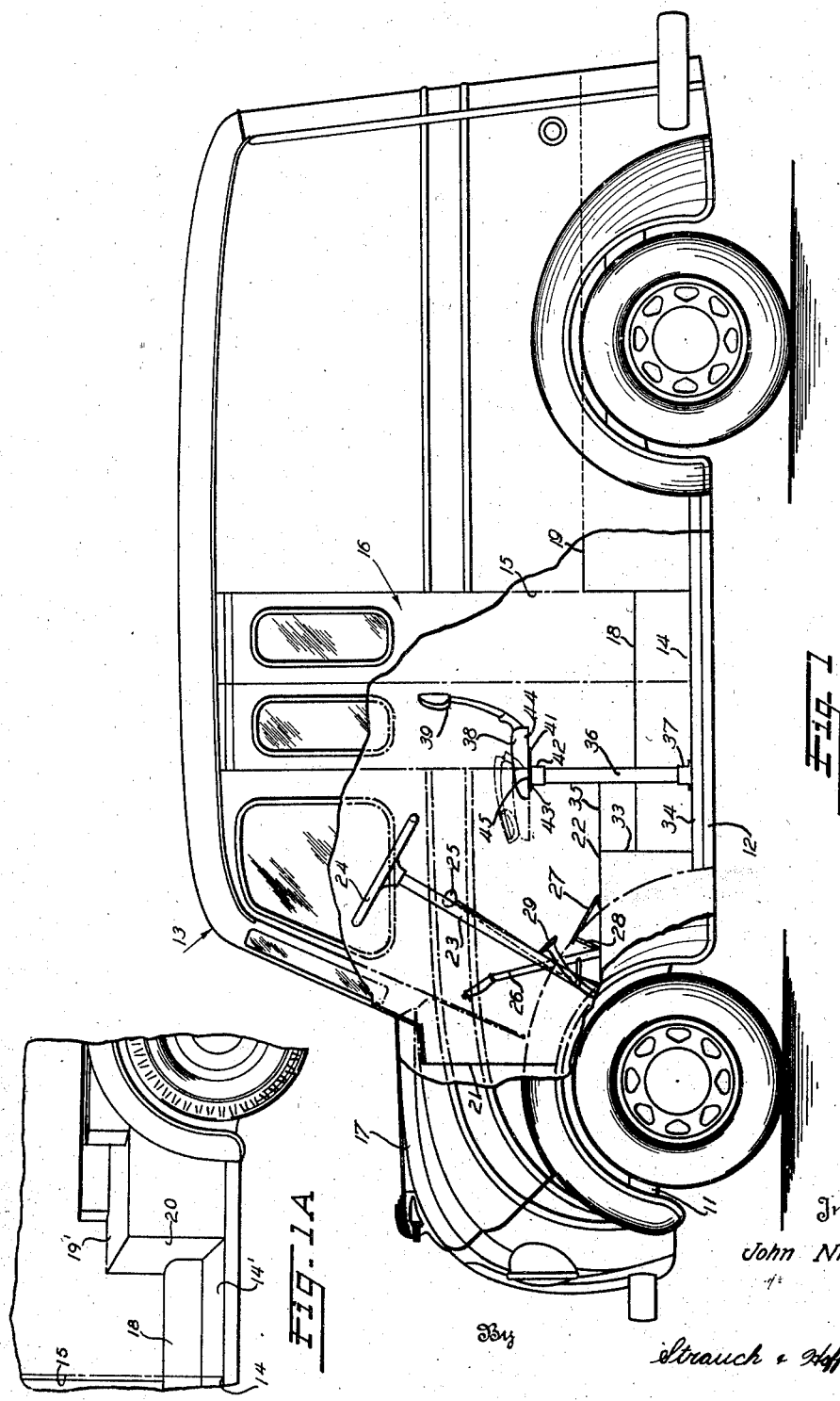
Inventor
John Nicol
By
Strauch & Hoffman
Attorneys June 4, 1940. J. NICOL 2,203,599
SITTING DRIVE DELIVERY VEHICLE
Filed Dec. 7, 1938 2 Sheets-Sheet 2
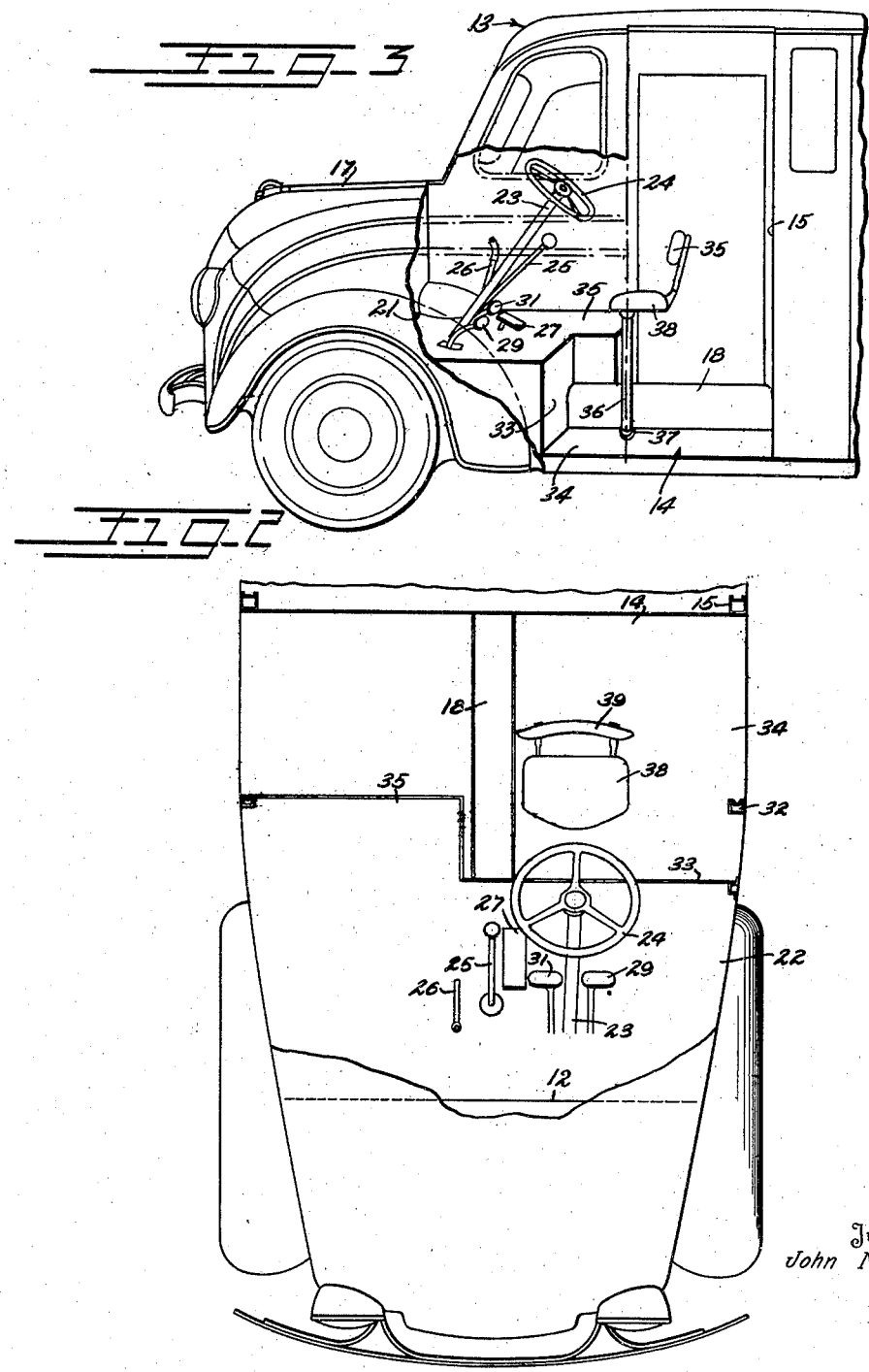
Inventor
John Nicol
Strauch & Hoffman
Attorneys Patented June 4, 1940

2,203,599

UNITED STATES PATENT OFFICE 2,203,599

SITTING DRIVE DELIVERY VEHICLE

John Nicol, Detroit, Mich., assignor to Divco-Twin Truck Company, Detroit, Mich., a corporation of Michigan Application December 7, 1938, Serial No. 244,490

12 Claims. (Cl. 180—77)

My invention relates to delivery vehicles and is more particularly concerned with door to door delivery vehicles which are driven from a sitting position.

Recently the door to door type of delivery vehicle which is driven from a sitting position has been developed along many different lines to provide a more effortless manner of entrance and exit for the operator to help him load and unload the vehicle during his many stops on the ordinary urban door to door delivery route.

In many of these vehicles entrance to the floor upon which the driver's seat is located is gained through the medium of a low level platform usually cut back to the frame of the vehicle and disposed substantially only a single step above the ground. This platform may be provided only on one side of the body or may be provided on both sides. In entering these vehicles the operator steps from the ground onto the platform and then must take another step upward to the main vehicle floor before he can be seated in driving position. This extra upward step, repeated many times in the course of a delivery route, represents work with consequent fatigue and losses in time and general efficiency on the part of the driver.

In many of these prior art vehicles the seating arrangements are such as to prevent unobstructed passage from one side of the vehicle to the other and to interfere with loading and unloading operations, the operator being obliged to lean over and contort his body to avoid the seat as he reaches into the rear compartment for a package.

With the above defects of the prior art in mind it is a major object of the present invention to provide a novel sitting drive door to door delivery vehicle wherein access to the driver's seat is gained with a minimum of effort and wherein the seating arrangements are designed in such a manner as not to interfere with loading and unloading operations of the vehicle.

A further object of the invention is to provide a novel sitting drive door to door delivery vehicle wherein a low level passageway leads from a side doorway in the vehicle body to the driver's seat whereby the driver may pass directly into the interior of the body and to his seat with a minimum of effort and without further upward steps. In some embodiments of the invention the low level passageway extends transversely across the body so as to permit convenient passage from one side of the body to the other with a minimum of effort.

A further object of the invention is to provide a novel sitting drive door to door delivery vehicle wherein a low level passageway disposed substantially only a single step above the ground leads from a side doorway to a front elevated floor within the body at which vehicle control mechanisms are located designed to be operated by a driver seated in a seat disposed above the passageway and wherein, when the driver is seated in normal driving position, the seat projects rearwardly of the front edge of the doorway but is adjustable to a position forwardly of the doorway so as not to interfere with passage along the passageway at the doorway, or with loading and unloading operations when the vehicle is not being driven.

Further objects of the invention will presently appear as the description proceeds in connection with the appended claims and the annexed drawings in which:

Figure 1 is a side elevation of the sitting drive behicle of my invention illustrating the platform arrangements and the adjustable seat assembly.

Figure 1A is a fragmentary view of a modification of the structure of Figure 1 illustrating the invention as applied to a delivery truck body wherein the low level platform extends a substantion distance rearwardly of the through aisle.

Figure 2 is a top plan view of the vehicle of Figure 1 illustrating further the platform and seating arrangements.

Figure 3 is a perspective view of the interior of the front end of the body cut away to show the control and seating arrangements and with the side door open.

Referring to Figure 1, a chassis 11 having a drop portion 12 supports a body generally designated at 13. Within the body and above drop portion 12, a through aisle whose floor comprises a low level platform 14 extends transversely across the body between oppositely disposed doorways 15 cut in the sides of the body. Each doorway is provided with suitable sliding or folding doors indicated at 16 which are movable out of the doorways to permit easy access to the interior of the body.

Drop portion 12 and platform 14 are so correlated and designed that platform 14 is at least as low as the plane containing the axes of the wheels supporting the chassis and preferably slightly lower so that platform 14 is only a single short step above the ground level.

The drive shaft from the motor, which is located under hood 17 at the forward part of the chassis, extends through a relatively narrow longitudinal central tunnel or housing 18 upstanding from platform 14 to the rear or driven wheels. Otherwise platform 14 provides unobstructed passage from one side of the vehicle to the other. The term "substantially unobstructed" as used in the claims is intended to embrace aisles or platforms which have drive shaft tunnels of this nature as well as aisles or platforms which do not have such tunnels as where front wheel drives and rear engine drives are used.

The roof of body 13 is spaced far enough above platform 14 to permit standing height clearance and an operator is enabled to walk across the substantially unobstructed platform from one side of the vehicle to the other without stooping.

The above described general chassis and tunnel arrangements used in the present invention are quite similar to those used in the vehicle described in my copending application Serial No. 202,536 filed April 16, 1938. Rearwardly of platform 14, an elevated load storage floor 19 extends to the rear end of the vehicle as disclosed in that application.

Forwardly of platform 14, however, the body and control arrangements of the vehicle of the present invention are designed to provide a vehicle which can be driven from a sitting position only as distinguished from the stand drive vehicle of that application.

A dash board 21 provides a front boundary for the interior of the body and extends downwardly to an elevated front floor 22 through which a plurality of vehicle controls extend upwardly from the chassis. These controls comprise a steering post 23 having a control wheel 24, a gear shift lever 25, a drive shaft brake lever 26, a pivoted accelerator pedal 27 having a throttle connection 28, a clutch pedal 29 and a brake pedal 31.

As illustrated in Figure 2, these controls are grouped adjacent the longitudinal medial portion of the body at the left side of the body. Floor 22 terminates a substantial distance forwardly of the left front door post 32. Platform 14 extends forwardly at the left side of tunnel 18 to a substantially vertical panel 33 which rises to the front edge of floor 22. The front end of tunnel 18 is secured to panel 33. That portion of platform 14 which lies forwardly of the doorway provides a platform extension or passage floor 34 which is preferably of even height with platform 14 although if desired it can be made slightly higher or lower as desired or as permitted by the chassis structure.

In any event, it will be understood that when the terms "substantially continuous with" or "substantially even with" are applied to the relative levels of platform 14 and passage floor 34 such is intended to include slight differences in level which do not require appreciable effort to traverse as well as the continuous platform illustrated in the drawings.

At the opposite side of the body from passage floor 34 is an elevated load carrying floor 35, substantially even with the contiguous portion of floor 22. Floor 35 terminates just short of the plane interconnecting the front edges of doorways 15 and preferably houses a tool compartment or further storage compartments.

A vertical seat supporting post 36 is removably mounted in a suitable socket 37 on the floor of passage 34 just forwardly of platform 14 and adjacent tunnel 18. As shown in Figures 1 and 2, post 36 is substantially parallel with and just forward of the plane interconnecting the front edges of the dorways and is aligned, longitudinally of the vehicle, with steering post 23.

A driver's chair comprising a generally horizontal seat portion 38 and a foldable back portion 39 is mounted for sliding movement on post 36 longitudinally of the vehicle.

Support plate 41, which is removably mounted by means of a suitable socket 42 upon the top of post 36, is formed at its top surface with a suitable slide guide for receiving a cooperating slide member secured to the bottom of seat 38. These guide and slide guide members are preferably of the well known dove tailed type and any suitable latching means such as the releasable spring pressed latch means 43 are provided on plate 41 for cooperating with suitable formations 44 and 45 provided at the bottom of the seat 38 for stopping and retaining the seat member in its forwardly and rearwardly adjusted positions respectively.

It will be understood that any suitable mechanism other than the above described guide structure may be used for slidably supporting seat 38 upon post 36, and, since the invention is not concerned with the specific details of these adjustments, it is believed that no further description of the same is necessary.

Furthermore, any other suitable mechanism for quickly adjusting seat 38 from the aisle may be used in place of the above described adjustment as for example a suitable pivoted support for the seat on post 36.

When seat 38 is in the full line sitting position of Figure 1, a driver sitting on the seat has full and convenient access to all of the vehicle controls above described with his feet resting on the floor 22 and adapted to engage pedals 27, 29 and 31.

When the seat is in the dotted line folded position of Figure 1 it is substantially forwardly of the plane interconnecting the front edges of the door-ways and permits unobstructed passage along the through aisle. While as shown in Figure 1, a small portion of the illustrated seat member projects a slight distance into the aisle it will be understood that such does not offer material obstruction to passage along the through aisle and such arrangements are included within the scope of claims reciting that the seat is adjusted "substantially forwardly" of the doorway edges or the platform as well as seat adjustments which move the seat actually wholly forwardly of the aisle.

While the delivery truck is being loaded for a trip, the seat is folded and pushed forwardly to the folded position of Figure 1 where it does not obstruct passage along the through aisle. The loading process is relatively easy because platform 14 is only a single short step above the ground and nearly all parts of rear floor 19 are easily reached from platform 14.

After the vehicle is loaded the seat is returned to the sitting position illustrated in Figure 1 to be used by the operator as he drives the vehicle to the various points of delivery.

When delivering his parcels at the various stops, the driver gets off the seat, walks along passage floor 34 to the through aisle portion of platform 14 and reaches into the storage space above floor 19 for the desired parcel. The front loading floor 35 may contain parcels to be first delivered and it is of course immaterial from what floor he gets the parcel. The seat can be pushed forwardly if desired depending upon the size of the parcel ordinarily. The driver then alights, delivers the parcel and returns to the vehicle where he steps directly into the interior and walks quickly and directly to the driver's chair where he seats himself and swings his legs up onto floor 22 adjacent the control pedals.

Seat 38, as shown in Figures 2 and 3 is located above the platform directly rearwardly of the controls and is disposed closer to the longitudinal center line of the body than the doorway or the body side wall forwardly of the doorway. This arrangement which positions the seat a substantial distance laterally inwardly of the doorway enables the driver to step from the through aisle along passage floor 34 between the seat and the front edge of the doorway to a point forwardly of the doorway where he may easily seat himself.

It is well known that the effort of climbing steps is particularly tiresome especially when repeated time and again. In the present invention the actual step climbing of the driver is limited substantially to a single short step from the ground to platform 14 and all of his further movements within the body take place upon a relatively level platform.

This arrangement results in greater speed and less fatigue on the part of the driver and leads to greatly improved and efficient delivery service.

In the embodiment of the invention illustrated in the drawings, the driver can step out on the curb side where the platform 14 is almost level with the curb and very little effort is involved.

As illustrated in Figure 1A, the low level platform 14 may be provided with a rearwardly extending portion 14 disposed rearwardly of the through aisle as defined by the side doorway edges. A vertical panel 20 rises from the platform to the elevated rear loading and storage floor 19'.

In this modification of the invention it is not necessary to even provide for forward adjustment of the seat assembly, although such may be provided if desired, because there is plenty of room for the operator to pass along platform 14' around the rear of seat assembly even when it is in sitting drive position. It is therefore within the principles of the invention to provide a rigid seat assembly upon post 36 when the low level platform is extended rearwardly as at 14'.

The present invention is also intended to be applied to vehicles of the type wherein a low level platform similar to platform 14 is provided at only the driver's side of the vehicle.

Furthermore, the invention is intended to embrace vehicles in which a single pedal operates the clutch and brake mechanisms in sequence as well as where the gear shift lever and the propeller shaft brake are disposed above the floor 22 to provide additional loading space.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a sitting drive vehicle body, an elevated floor at the front end of said body and a plurality of vehicle controls extending upwardly at said floor, a low level platform at at least the driver's side of the body disposed substantially only a single step above the ground level, a doorway at that side of said body leading to said platform, said platform extending at said driver's side of said body a substantial distance forwardly of said doorway to said elevated floor, a post upstanding from said platform adjacent the longitudinally central portion of said body and a driver's seat slidably supported above said platform rearwardly of said elevated floor, said seat when in use as the vehicle is being driven projecting a substantial distance rearwardly beyond the front edge of said doorway and said seat being slidable to a position of disuse substantially forwardly of said doorway where it does not obstruct passage along the platform adjacent the doorway.

2. In the sitting drive vehicle body of claim 1, means for retaining said seat in either position.

3. In a sitting drive vehicle body a low level platform at at least the driver's side of said body and a doorway at that side of the body leading to said platform, said platform being disposed only substantially a single step above the ground, an elevated floor at the front end of the body, a portion of said platform at said driver's side of said body extending a substantial distance forwardly of the doorway to said elevated floor, clutch and brake control mechanism and a steering post extending upwardly from said floor and a driver's seat slidably mounted upon a support arising from said platform forwardly of the doorway and aligned with the steering post whereby the driver has convenient access to the operating controls of the vehicle, said seat projecting a substantial distance rearwardly of said doorway when in use but being slidable substantially forwardly of the front edge of the doorway when the vehicle is not being driven and passage room is desired at the platform and said seat being located well within the vehicle closer to the longitudinal medial portion thereof than to said doorway.

4. In a sitting drive vehicle body, a low level platform at at least the driver's side of the body disposed substantially only a single step above the level of the ground; a doorway at that side of the body leading to said platform; an elevated floor at the forward end of that side of said body and pedal operated vehicle control mechanism extending upwardly at said floor; an operator's seat within said body in longitudinal alignment with said control mechanism and located a substantial distance laterally inwardly of the doorway so as to be closer to the longitudinal center line of the body than to the interior of the side wall of the body at that side, said platform having an unobstructed passage floor portion at said driver's side of the body extending a substantial distance forwardly of said doorway to said elevated floor and providing a passage between said body side wall and said seat so that the operator may step directly into the interior of said vehicle and pass directly along said platform and passage floor portion thereof to his seat with a minimum of effort.

5. In a sitting drive vehicle body, a low level platform at at least the driver's side of the body disposed substantially only a single step above the ground level; a doorway at that side of the body leading to said platform; an elevated floor at the forward end of said body forwardly of said doorway and pedal control mechanism for operating the vehicle extending upwardly at said floor at said side of the body, said low level platform at said driver's side of said body extending forwardly of the front edge of said doorway to said elevated floor; and a driver's seat disposed directly rearwardly of said controls above said platform and located well within the interior of the vehicle and spaced sufficiently laterally inwardly of the front edge of the doorway to permit the driver, after stepping into the vehicle, to pass along the forwardly extending portion of the platform between the seat and the front edge of the doorway to a point forwardly of the doorway where he can easily seat himself.

6. In the sitting drive vehicle defined in claim 5, said seat when in driving position extending at least partly rearwardly of the front edge of said doorway and a support arising from said platform forwardly of the front edge of said doorway for supporting said driver's seat in such a manner that said seat may be quickly moved substantially forwardly of the doorway as desired.

7. In a sitting drive vehicle body, a low level aisle of standing height clearance disposed substantially only a single step above the level of the ground extending between oppositely disposed side doorways in said body; an elevated floor at the front end of the body and pedal operated vehicle control mechanism extending upwardly from said floor at one side of said body; a driver's seat rearwardly of said floor positioning the driver for easy access to said control mechanism; a low level passage, whose floor communicates and is substantially continuous with the floor of said aisle, disposed immediately rearwardly of said control mechanism and forwardly of said aisle and said seat between said aisle and said elevated floor whereby the driver may easily step directly into the interior of said vehicle and pass directly along said aisle and passage to his seat with a minimum of effort; and an elevated loading floor at the other side of said body forwardly of the aisle and substantially continuous with said front elevated floor at said other side.

8. In a sitting drive vehicle body, a low level platform at at least the driver's side of said body disposed substantially only a single step above the ground level; a doorway at that side of said body opening to said platform; an elevated floor extending across the forward end of said body forwardly of said doorway and pedal control mechanism for operating the vehicle extending upwardly at said floor at said side of the body, said platform at said driver's side of the body extending a substantial distance forwardly of said doorway to said floor; a driver's seat disposed directly rearwardly of said control mechanism and above the platform a substantial distance laterally inwardly of said doorway, said seat being located close to the longitudinal medial portion of said vehicle and spaced sufficiently from the front edge of the doorway to provide unobstructed passage along the forwardly extending portion of said platform forwardly of said doorway; and a support for said seat arising from said platform.

9. In a sitting drive vehicle body, an elevated floor at the front end of the body and a plurality of vehicle controls extending upwardly at said floor at one side of the body; a through aisle of standing height clearance whose floor comprises a low level platform extending between opposite side doorways in said body and a raised longitudinal propeller shaft housing extending along said low platform centrally of said body, said platform extending forwardly of the doorway at that side of the body which lies directly rearwardly of said controls so as to provide low level flooring between said housing and the adjacent body side wall forwardly of the doorway; and means supporting a driver's seat above said platform directly rearwardly of said controls and closely adjacent said housing so as to provide for quick and easy passage of said driver along said platform forwardly of the doorway to his seat, said seat when in use projecting at least partly rearwardly into said through aisle and being movable substantially forwardly of said doorway so as not to obstruct said through aisle when not in use.

10. In a sitting drive vehicle body, a through aisle of standing height clearance whose floor comprises a low level platform disposed substantially only a single step above the ground upon which the vehicle rests extending between opposite side doorways in said body; a low level platform portion extending rearwardly of said aisle beyond the rear edges of said doorways to an elevated rear body floor; an elevated floor at the front end of said body and pedal operated vehicle control mechanism extending upwardly from said elevated front floor at one side of said body; a low level platform portion extending forwardly of the front edge of the doorway at said one side of the body to the elevated floor; and a driver's seat assembly rearwardly of said control mechanism positioning the driver for easy access to said control mechanism but appreciably obstructing passage along said aisle when in sitting drive position, said rear platform extension providing a ready path for easily passing around the rear of said seat assembly whereby the driver is enabled to step directly into the interior of the vehicle and pass from one doorway to the other with a minimum of effort.

11. In a sitting drive vehicle wherein a body is supported on a chassis having a forwardly disposed engine and a dropped portion rearwardly of said engine, a platform extending entirely across said body above said dropped portion, said platform being located only a single short step above the level of the surface upon which the chassis wheels rest and providing a through aisle of standing height clearance between oppositely disposed doorways in the sides of said body, a longitudinal propellor shaft housing projecting upwardly from said platform, a floor elevated above said platform and located at the front end of said vehicle forwardly of said through aisle, controls for said vehicle upstanding from said floor, a driver's seat aligned with said controls, and an unobstructed extension of said low platform extending forwardly of said through aisle and forwardly of the doorway along the front side body wall at the driver's side of the body, said platform extension terminating adjacent said floor and providing a passage of standing height clearance forwardly of the through aisle, and said driver's seat being spaced sufficiently laterally inwardly from the adjacent doorway and front side body wall to enable the driver to pass easily along said platform extension between said driver's seat and the adjacent side of the body to a convenient forward location where he may swing himself onto said seat in position to manipulate said vehicle controls with a minimum of effort.

12. In the vehicle defined in claim 11, said floor extending entirely across the front end of the body, and a second floor elevated above said platform and extending forwardly therefrom to said first floor, said second floor providing a front loading platform at the opposite side of the vehicle from said platform extension.

JOHN NICOL.